Patented May 19, 1925.

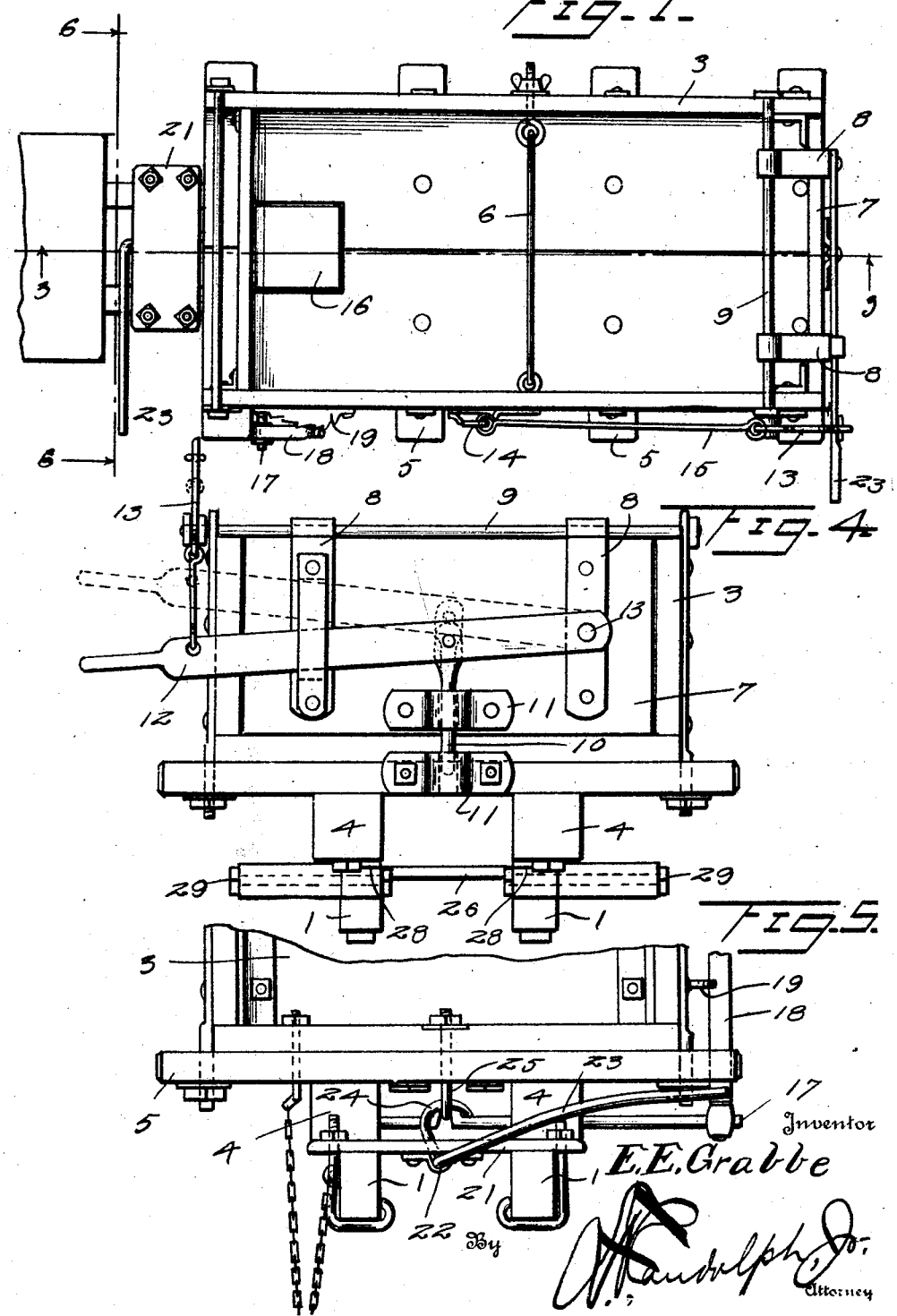

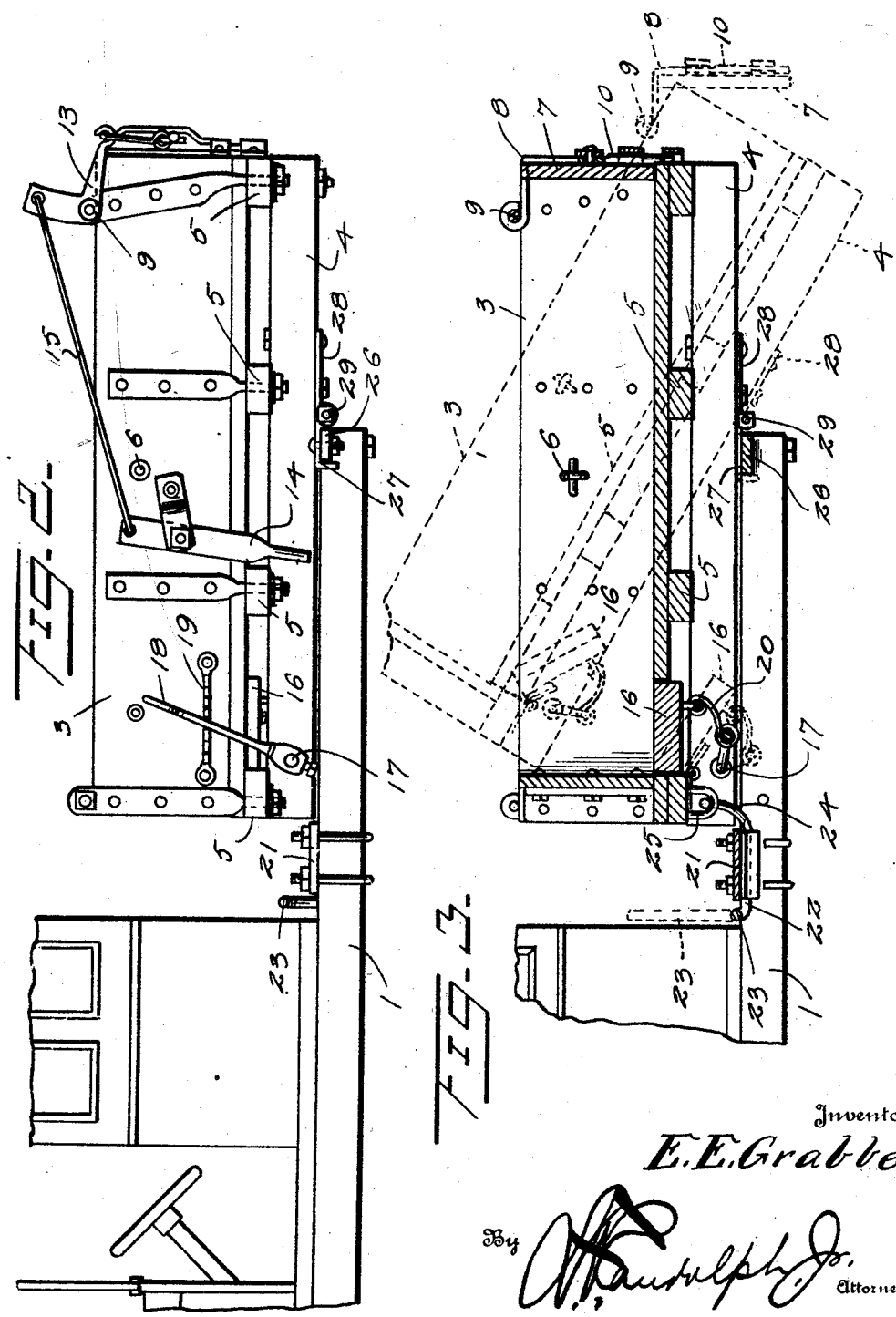

1,538,695

UNITED STATES PATENT OFFICE.

ELMER E. GRABBE, OF SANDBORN, INDIANA.

DUMPING-WAGON BODY.

Application filed November 28, 1923. Serial No. 677,446.

*To all whom it may concern:*

Be it known that I, ELMER E. GRABBE, a citizen of the United States, residing at Sandborn, in the county of Knox and State of Indiana, have invented certain new and useful Improvements in Dumping-Wagon Bodies; and I do hereby declare the following to be a full, clear, and exact description of the invention, such as will enable others skilled in the art to which it appertains to make and use the same.

The invention relates to wagon bodies which are mounted to tilt so as to facilitate the discharge of the load carried thereby in bulk.

The primary object of the invention is the provision of a dumping wagon body particularly adapted to the chassis of a motor vehicle, such as the Ford automobile, the body including a trap door through which a portion of the load is discharged with the result that the turning of the body may be easily effected.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a top plan view of a dumping wagon body embodying the invention, showing the same applied to a portion of the chassis of a Ford automobile, Figure 2 is a side view, Figure 3 is a vertical longitudinal section, Figure 4 is a rear view, and Figure 5 is a detail sectional view on the line 6—6 of Figure 1, the upper portion being broken away.

Corresponding and like parts are referred to in the following description and designated in the several views of the drawings by like reference characters.

The numeral 1 designates the longitudinal beams forming part of the chassis of a motor vehicle, such as the Ford automobile. A wagon body 3 is mounted upon the bars 1 to tilt, as indicated by the dotted lines in Figure 3, whereby to facilitate the discharge of the load. Longitudinal beams 4 are disposed beneath the body 3 in spaced relation and bolsters 5 are mounted thereon and in turn receive the body 3, the sides of which are connected by means of a tie 6. The tail gate 7 is hingedly connected by means of straps 8 to a transverse rod 9 so as to swing outwardly at its lower edge, as indicated by the dotted lines in Figure 3. A latch bolt 10 mounted upon the tail gate is adapted to engage a keeper 11 at the rear end of the bottom to hold the tail gate in closed position. A lever 12 pivoted at 13 to the tail gate, has the latch bolts 10 connected thereto and its outer end is connected to a bell crank 13 mounted upon an end of the rod 9. A lever 14 at one side of the body is connected by means of the rod 15 to the other member of the bell crank 13, thereby admitting of the tail gate being released by operation of either one of the levers 12 or 14.

A trap door 16 is provided in the front end of the bottom of the wagon body and admits of the discharge of a portion of the load so as to lighten the front portion of the body, thereby enabling the latter to be easily tilted to discharge the remainder of the load. A shaft 17 is disposed beneath the bottom of the body and is mounted in the beam 4 and is provided at one end with a lever 18 which is adapted to cooperate with a toothed bar 19 whereby to hold the lever in the required adjusted position. A link 20 connects a crank portion of the shaft 17 with the trap door 16 and by manipulating the lever 18, the trap door may be opened or closed as required.

A plate 21 is secured to the bars 1 in advance of the tilting body and a shaft 22 is mounted thereon. The forward end of the shaft 22 is provided with a lever 23 and its rear end with a hook 24 which is adapted to engage a staple 25 or like part whereby to secure the body in normal position. The lever 23 normally occupies an approximately horizontal position, as shown most clearly in Figure 6 and is operable from a side of the machine, the several levers 14, 18 and 23 being conveniently grouped so as to be accessible from the side of the machine adjacent the front of the wagon body.

A crossbar 26 is secured to the rear ends of the bars 1 and hinge members 27 are bolted or otherwise secured thereto. Complemental hinge members 28 are attached to the beams 4 and the two hinge members 27 and 28 are hingedly connected by means of pintles 29. The ends of the crossbar 26 project beyond the bars 1 and the wagon body is hinged thereto so as to tilt to discharge the load, as indicated by the dotted lines in Figure 3.

What is claimed is:

1. A wagon body pivotally mounted intermediate its ends to tilt and provided in the front portion of its bottom with a trap door to facilitate the tilting of the body by discharging a portion of the load therethrough, and a shaft mounted upon the body and having crank connection with the trap door to effect opening or closing thereof.

2. In a wagon body, a transversely disposed rod, a tail gate, a hinge connection between the tail gate and transverse rod, a latch bolt for securing the tail gate when closed, a bell crank mounted upon said transverse rod, connecting means between a member of the bell crank and the latch bolt, a lever at one side of the body, and connecting means between said lever and the other member of the bell crank.

In testimony whereof I affix my signature in presence of two witnesses.

ELMER E. GRABBE.

Witnesses:
 OTTO HAGEMIER,
 HENRY A. STRATE.